United States Patent [19]
Blatt

[11] 3,734,303
[45] May 22, 1973

[54] TRAVEL CYLINDER AND GRIPPER ACTUATOR WITH TRIPLE GUIDE RODS

[76] Inventor: Leland F. Blatt, 790 Shoreham Road, Grosse Pointe Woods, Mich. 48236

[22] Filed: Feb. 24, 1972

[21] Appl. No.: 228,849

[52] U.S. Cl. ............................................. 214/1 BB
[51] Int. Cl. ............................................... B66c 1/42
[58] Field of Search ......................... 214/1 B, 1 BB

[56] References Cited

UNITED STATES PATENTS

| | | | |
|---|---|---|---|
| 1,575,185 | 3/1926 | Stenhouse | 214/1 BB |
| 2,763,229 | 9/1956 | Sahlin | 214/1 BB |
| 3,013,835 | 12/1961 | Blatt | 214/1 BB |
| 3,260,376 | 7/1966 | Stoll | 214/1 BB |
| 3,648,854 | 3/1972 | Potter | 214/1 BB |

Primary Examiner—Robert B. Reeves
Assistant Examiner—Frederick R. Handren
Attorney—Robert A. Sloman

[57] ABSTRACT

A material handling device of increased rigidity and carrying capacity which includes a travel cylinder assembly and actuator for a workpiece gripper. A hanger supports spaced bushing plates mounting parallel spaced bushings containing housings to slidably receive three guide rods. Two, thereof, are arranged laterally and a third therebetween and below. The one ends of the guide rods are bracketed together. The other ends of the guide rods are secured to the gripper actuator and movable therewith on activation of the travel cylinder.

A modification provides for successive locating feed of the gripper actuating assembly with actuation of the gripper jaws thereafter. A further modification includes a further guide or carrier rod mounting the jaw actuating assembly for a more extended locating feed preceding actuation of the jaws.

11 Claims, 8 Drawing Figures

Patented May 22, 1973 3,734,303

Patented May 22, 1973 3,734,303

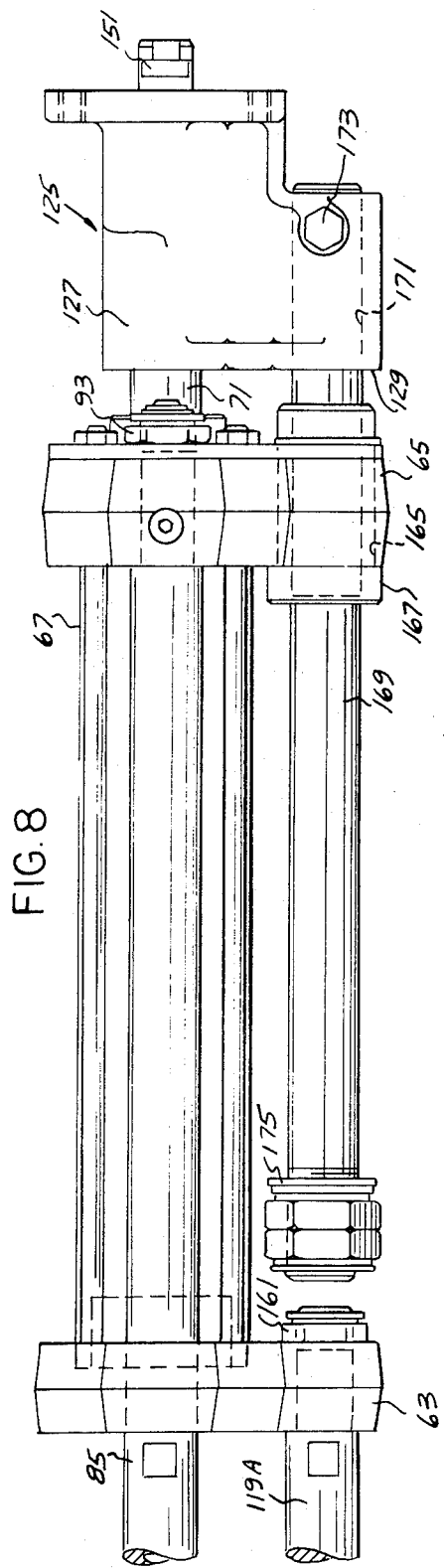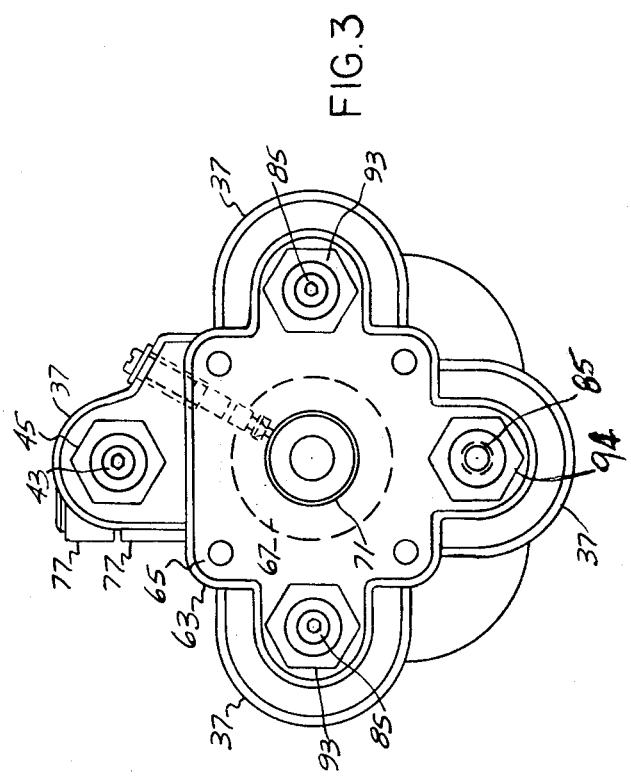

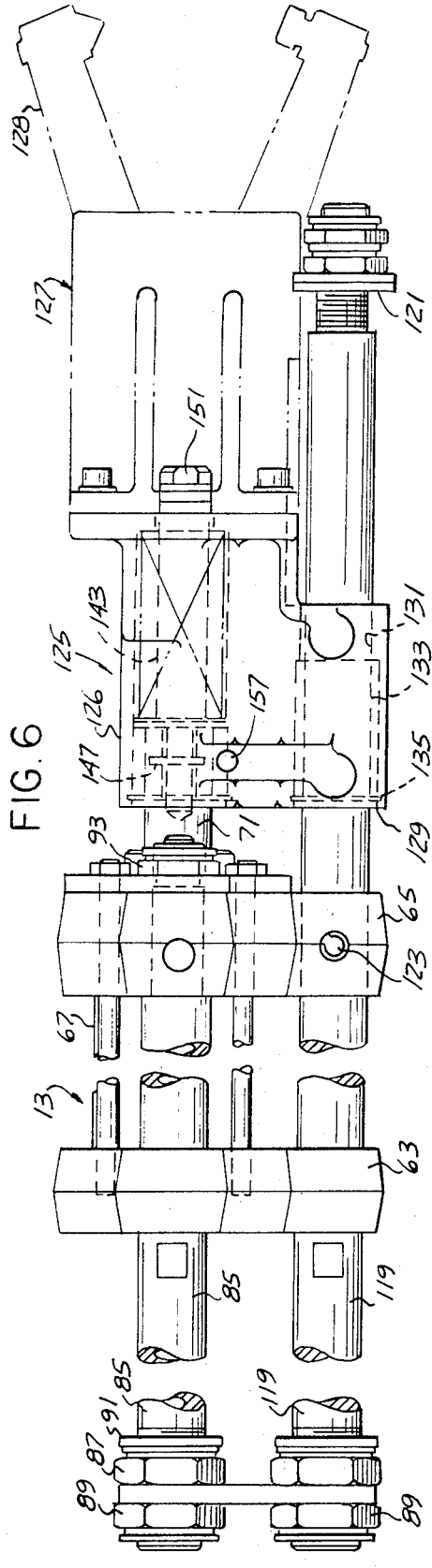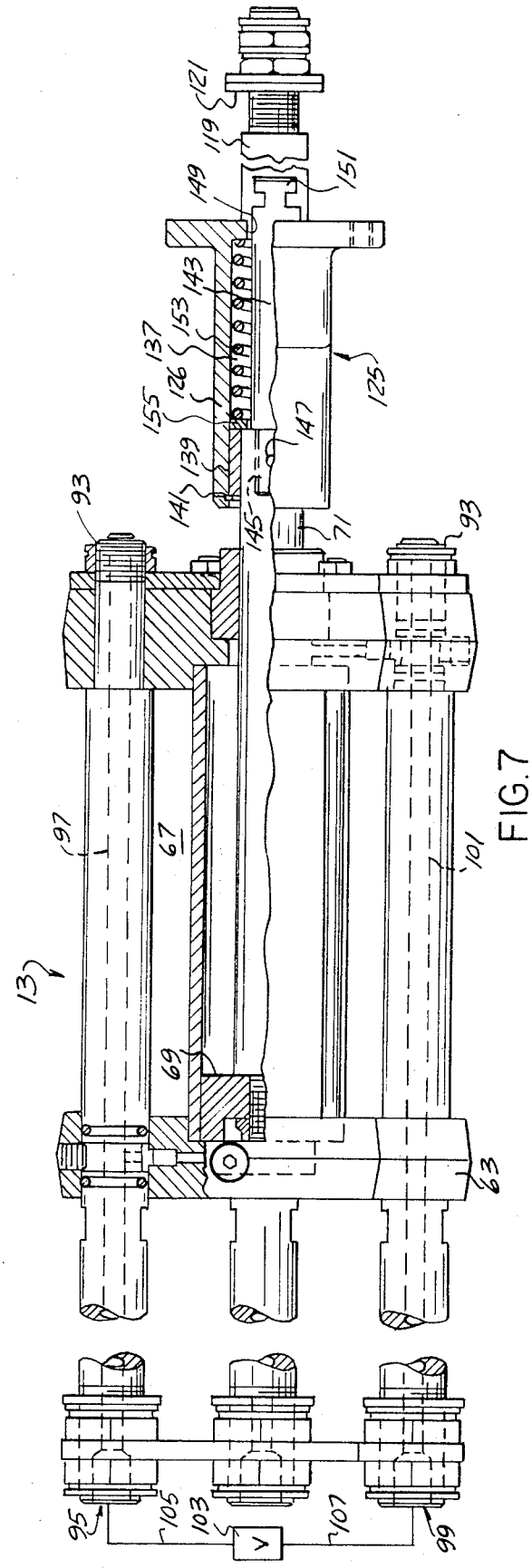

TRAVEL CYLINDER AND GRIPPER ACTUATOR WITH TRIPLE GUIDE RODS

BACKGROUND OF THE DISCLOSURE

The present invention is an improvement in the material handling device actuator of my U.S. Pat. No. 3,371,583 dated Mar. 5, 1968. The present travel cylinder assembly causes longitudinal feed movements of an actuator controlling opening and closing of the workpiece gripper. It is required that there be sufficient stability and rigidity to the assembly to provide proper carrying capacity for the particular workpiece to be transported to a machine tool such as a press, left there for a machining operation and thereafter, removed from the machine tool.

BRIEF DESCRIPTION OF THE INVENTION

It is an object of the present invention to provide an improved material handling device which includes a travel cylinder assembly and actuator assembly for a workpiece gripper and, wherein, improved guide means are provided; namely, a plurality of guide rods, at least three. Said guide rods are rigidly interconnected at their one ends, are slidably and guidably mounted upon bushings intermediate their ends with the bushings mounted upon a suspended housing mounting the travel cylinder and, wherein, the respective other ends of the guide rods are fixedly secured to the actuator.

It is a further object to provide an improved mounting for the guide rods and the elongated ball bushings including suitable housings therefore with front and rear bushing plates in such a manner that the guide rods are afforded longitudinal support throughout a substantial portion of their length for increased rigidity.

It is another object to provide a gripper locating assembly for operation after movement of the travel assembly, and with successive operation of the gripper actuating assembly.

These and other objects will be seen from the following specification and claims in conjunction with the appended drawings in which:

FIG. 3 is a right end elevational view thereof.

FIG. 6 is a fragmentary side elevational view corresponding to FIG. 4 illustrating only the jaw locating cylinder assembly and the jaw actuating assembly and associated jaw assembly.

FIG. 7 is a fragmentary partly broken away and sectioned plan view thereof.

FIG. 8 is a fragmentary side elevational view of a modified jaw located assembly.

It will be understood that the above drawings illustrate merely preferred embodiments of the invention, and that other embodiments are contemplated within the scope of the claims hereafter set forth.

DETAILED DESCRIPTION

Figure 1:
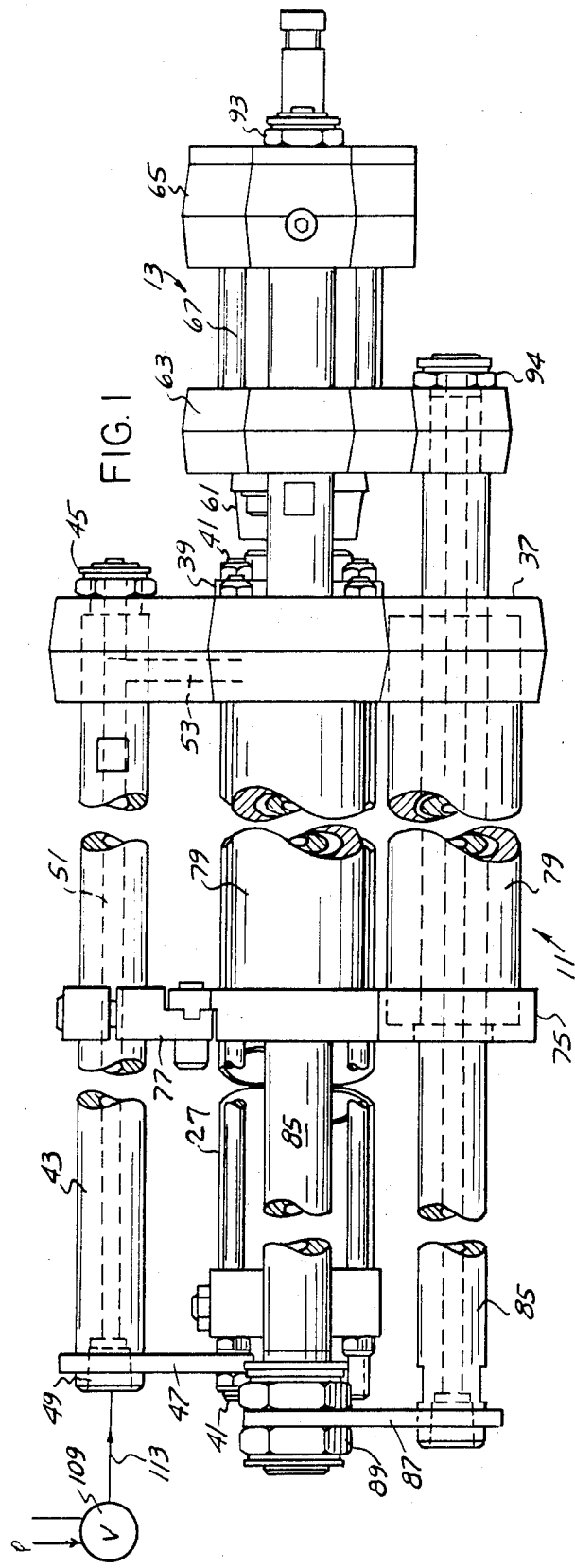
FIG. 1 is a fragmentary side elevational view of the present travel cylinder and actuator assembly, partly broken from illustration.
Figure 2:
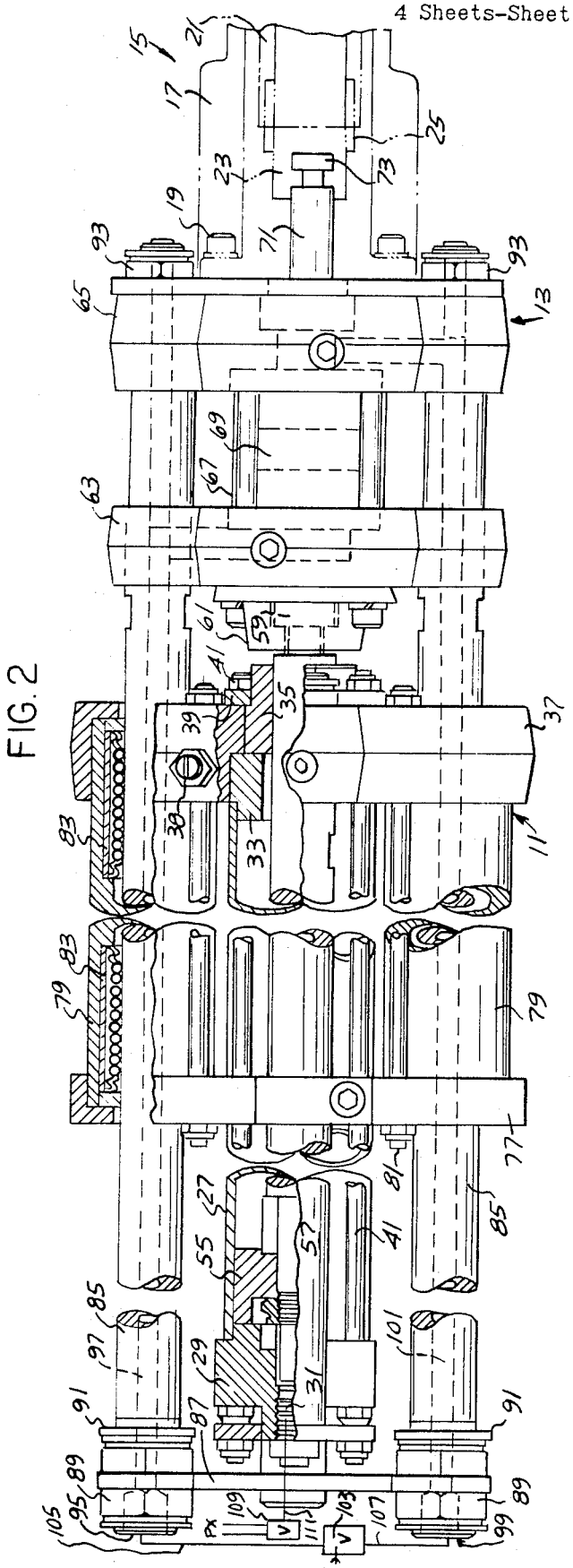
FIG. 2 is a plan view thereof with the workpiece gripper fragmentarily shown.

Referring to the drawing; FIGS. 1, 2 and 3, the travel cylinder assembly is generally indicated at 11, the jaw actuator assembly at 13 and the workpiece gripper assembly at 15, in dotted lines.

Though not forming a part of the present invention, the gripper head includes body 17 secured to actuator assembly 13 by fasteners 19 and a pair of oppositely arranged pivotal workpiece engaging jaws 21. The longitudinally reciprocal clevis 23 is connected to the pivotal jaws by a linkage 25, the clevis being reciprocated within body 17 by reciprocal movements of the actuator piston rod 71–73 hereafter described.

TRAVEL CYLINDER ASSEMBLY

Cylinder 27 at one end includes cap 29 with axial port 31. Cap 33 at its opposite end and associated gland 35 is supported and secured within the upright front bushing plate 37 and anchored in place by retainer plate 39 and cylinder tie rods 41.

Centrally disposed elongated hanger rod 43 is adapted for connection to a suitable crane or other overhead support and at one end extends through front bushing plate 37 and is secured thereto by fastener 45.

Hanger rod support 47 is secured to and depends from its other end and is secured to the cylinder through tie rods 41.

The hanger rod at one end includes a port 49 which communicates with a bore 51 through said rod adapted for communication with the opposite end of cylinder 27 for pressurizing same, as at 53.

The reciprocal piston 55 includes the axial first piston rod 57 which extends through rod end cap 33 and corresponding gland 35 projecting outwardly therefrom and terminating in the T-connector 59 which interlocks within rod bracket 61 secured to rear plate 63 of actuator assembly 13.

JAW ASSEMBLY ACTUATOR

The actuator for the workpiece gripper 15 includes a front plate 65 which is upright, parallel to and spaced from rear plate 63. Supported and sealed between said plates is actuator cylinder 67 with reciprocal piston 69 and second piston rod 71. The latter projects forwardly of said front plate and terminates in the T-connector 73 and is adapted for axial interlock and connection with reciprocal clevis 23 forming a part of workpiece gripper assembly 15.

GUIDE ROD MOUNTING ASSEMBLY

Upright rear bushing plate 75 is parallel to and spaced rearwardly of front bushing plate 37 and is suspended from hanger rod 43 by the two-piece rod clamp 77.

A series of parallel spaced longitudinally extending bushing housings 79 are interposed between bushing plates 37 and 75 and are retained by the corresponding tie rods 81.

There are a first pair of opposed laterally related bushing housings 79 best shown in FIG. 2. Arranged between said first bushing housings and there-below is the third bushing housing 79. Each of said bushing housings receives the elongated ball bushings 83.

The respective elongated longitudinally extending parallel guide rods 85 are slidably supported and movably extend through the respective elongated ball bushings within their respective housings mounted and supported between the front and rear bushing plates. The rear ends of the respective guide rods extend through and are suitably secured by fasteners 89 to the upright guide rod bracket 87.

Stop bumpers 91 are mounted upon the upper opposed laterally related guide rods adjacent bracket 87 and are adapted on longitudinal movement for operative engagement with rear bushing plate 75. The laterally related opposed parallel guide rods 85, namely the upper pair of guide rods shown in FIG. 2 extend through the rear and front plates 63, 65 of the gripper actuator assembly and are affixed to the said front plates by fasteners 93. Lower guide rod 85 extends through plate 63 and is secured thereto at 94.

One of the upper guide rods as viewed in FIG. 2 has a fluid pressure intake port 95 which communicates with an elongated passage 97 adapted to pressurize one end of the actuator cylinder 67. The other upper guide rod 85 has a port 99 communicating with an elongated passage 101 therein adapted for pressurizing the opposite end of actuator cylinder 67.

As shown schematically, the valve 103, FIG. 2 is adapted for connection to a source of fluid pressure such as compressed air and by a pair of separate conduits 105 and 107 respectfully connects the ports 95 and 99.

There is schematically shown in FIGS. 1 and 2 an additional control valve 109 adapted for connection to a source of pressure fluid such as compressed air and which through one conduit 111 connects the blind end cylinder port 31, FIG. 2, and through an additional conduit 113, connects the hanger rod port 49 for pressurizing the opposite end of cylinder 27, FIG. 1.

The basic construction for providing increased rigidity and carrying capacity for the jaw actuator assembly as well as the workpiece gripping assembly connected thereto is primarily effected by the three guide rods 85 supportably and guidably mounted within elongated ball bushings 83 within corresponding parallel spaced housings 79 which at their ends are mounted within and between the front and rear bushing plates 37 and 75.

The said bushing plates are, furthermore, fixedly secured to the cylinder 27 and its connected parts. The relatively stationary hanger rod 43 is also suitably connected to said cylinder as well as the respective front and rear bushing plates to provide a rigid construction.

As viewed in the drawing, the three elongated guide rods; namely, the laterally opposed pair of rods 85 as well as the centrally disposed lower guide rod are all guidably and slidably supported throughout a considerable portion of their length by virtue of the elongated bushing housings and their supporting plates.

Accordingly, on the initial operation of the cylinder 27, forward movement of the first piston rod 57 causes the actuator assembly 63, 65, 67 as a unit to move forwardly as supported by the forward ends of all three guide rods. This forward movement is continued until the stops 91 operatively engage the rear bushing plate 75. At that time, the secondary valve 103 is actuated for pressurizing the respective ports 95 or 99 to either close or to open the respective jaws 21.

MODIFICATION

Modification of the structure shown in FIGS. 1, 2 and 3 is illustrated in FIGS. 4 through 7. Here the jaw actuator 63, 65, 67 of FIGS. 1 and 2 has been replaced by a very similar jaw locating cylinder assembly 63, 65, 67 FIGS. 6, which is supportably mounted upon the lower and third longitudinally feedable guide rod 119 and affixed thereto as by fastener 123.

While the jaw actuator assembly 63-65-67 of FIG. 2 was adapted only for opening and closing the jaws 21 of the gripper, it is noted that the jaw located assembly 63-65-67 of FIG. 6 is adapted on initial activation of its piston rod 71, being the second piston rod, for locating the jaws 128 and the jaw actuating assembly 125 forwardly thereof. This therefore provides an additional locating travel in the illustrative embodiment of 4 ¾ inches, when the assembly 125 contacts the adjustable stop assembly 121 on rod 119. This stops forward movement of the jaw body, but allows continued forward movement of piston 71 into the jaw actuating assembly 125 connected to the third piston rod 143 for closing the gripper jaws 128.

The jaw actuating assembly 125 of FIG. 6 is shown in my copending U.S. Pat. application Ser. No. 97,599 filed Aug. 12, 1970.

Figure 4:
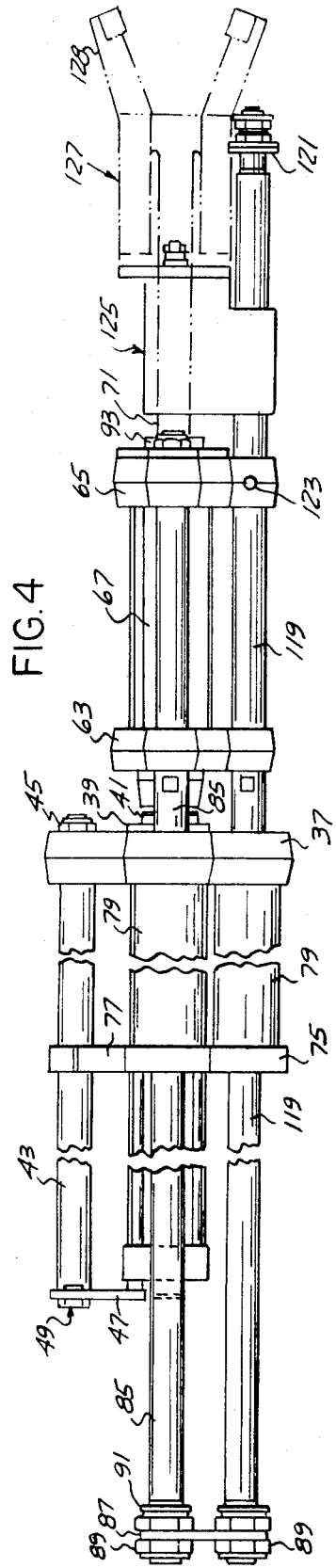
FIG. 4 is a side elevational view of the travel cylinder assembly, the jaw locating assembly and a modified jaw actuating assembly with associated jaw assembly being a modification.

The complete combination of the travel cylinder assembly, the jaw locating assembly, the jaw actuating assembly 125 and the jaw assembly 127 is shown in FIG. 4.

Figure 5:
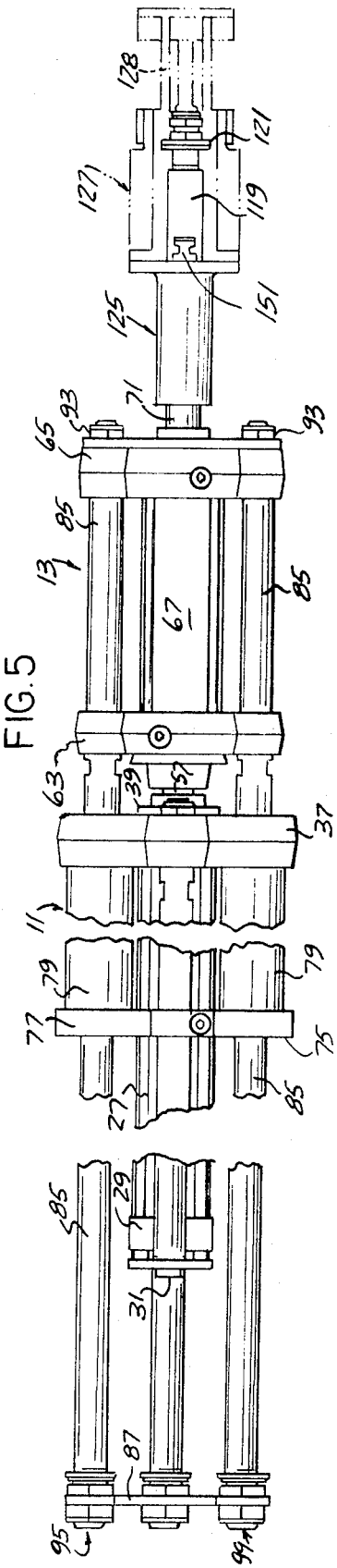
FIG. 5 is a plan view thereof, the jaw assembly being shown in dotted lines.

As above described with respect to FIGS. 1, 2 and 3, and as shown in FIGS. 4 and 5, the initial activation of the travel cylinder assembly causes longitudinal forward feed movement of the respective guide rods 85 and third bottom guide rod 119 until the stops 91 on said guide rods engage the rear bushing plate 75. Thereafter subsequent activation of the cylinder 67 through valve 103 and conduit 105 through port 95 and passage 97 activates the piston 69, FIG. 7, for further longitudinal locating movements of the jaw assembly and its connected jaw actuating assembly 125.

In this case since the jaw locating cylinder assembly 67 is anchored at 123 to the lower guide rod 119 further activation of the piston 69 projects the piston rod 71 forwardly causing further locating longitudinal movement of the jaw actuating assembly 125 until it hits the stop 121 adjustably anchored at the outer end of the lower guide rod 119.

JAW ACTUATING ASSEMBLY

The jaw actuating assembly 25 includes body 126 having a depending boss 129, FIG. 6, with longitudinal bore 131. Guide rod bushing 133 is nested in said bore and retained therein by bushing retainer 135 and slidably receives the lower guide rod 119.

Thus, on activation of piston rod 71, the jaw actuating assembly 125 moves forwardly until it engages the stop bumper 121, which is adjustable for fine positioning and, locating of the gripper 127 adjacent to the machine tool for engaging a workpiece to be removed.

JAW ACTUATOR

The jaw actuator 125, FIGS. 4 and 5, is shown in further detail in FIGS. 6 and 7 and includes longitudinal bore 137 within the outer end of which is bushing 139 anchored at 141, adapted to receive the end of the second piston rod 71.

Reciprocal third piston rod 143 is axially positioned within bore 137 and its rear extension 145 is threaded into the outer end of the second piston rod 71 and secured thereto by the transverse pin 147.

The other end of third piston rod 143 projects outwardly of bore 149 of body 126 and terminates in the T-connector 151 for selective interlock with the reciprocal clevis linkage mechanism which operates the jaws 128 in the manner above described with respect to FIGS. 1, 2 and 3.

Washer 155 is loosely nested within bore 137 and surrounds the third piston rod and bears against bushing 139 and the outer end of second piston rod 71.

Coiled compression spring 153 is interposed between said washer and the inner end of the body normally resisting longitudinal movement of the washer and second piston rod and connected third piston rod.

In this construction by continued advancing of the second piston rod 71, the actuator housing 125 moves forwardly until it engages the adjustable stop 121. At that time, further longitudinal movement of the piston rod 71 causes longitudinal outward movement of the third piston rod 143 for closing the jaws 128 upon a workpiece, as for example, within a machine tool after a stamping or other operation.

By reversing the pressurizing of travel cylinder assembly, its piston rod 57 retracts for removing the workpiece held by the jaws 128 from the machine too and retracting to a predetermined position where the travel cylinder assembly stops. This rearward movement of the piston rod 57 has caused the retracting movement of the jaw assembly 127, the jaw actuating assembly 125 and the jaw locating assembly 63–65–67.

At this point, if the jaw locating cylinder assembly is energized for movement of the piston rod 71 in the opposite direction tending to open the jaws 128, this action is promptly facilitated by expansion of the coil spring 153 within the actuator body 125 for quick opening of the jaws and the dropping of the workpiece. At this time, the cylinder assembly is effective to cause further retraction of the second piston rod 71 moving the jaw actuating assembly 125 back to its initial inoperative position.

Here it is seen from the description of FIGS. 4 through 7 that the travel cylinder through the length of the stroke permitted by its stops 91 effects initial positioning of the jaw positioning cylinder assembly 63–65–67. Separate energizing of the jaw positioning cylinder assembly causes jaw actuating assembly 125 to move forwardly to its final location engaging the stop 121, after which the jaws 128 are automatically closed.

This additional positioning movement of the jaw actuating assembly in the illustrative embodiment is 4 ¾ inch travel maximum. This embodiment provides maximum rigidity but limits the primary jaw stroke travel shown in FIG. 6.

This type of unit may be applied to loading a part into small presses, the part being prepositioned. The primary jaw travel of 4 ¾ inches picks the part up and the travel cylinder can be actuated to load the part into a particular tool and die, at which time, the jaw actuating cylinder reverses dropping the part on location and with the travel cylinder returning the unit to a rest position.

The unit may also be applied as a part extractor by having the travel completely outside of the work die. When the part is completed, the 4¾ inch travel could pick up the part in the die, eliminating the time of the longer travel cylinder which, at this time, could actuate withdrawing the part gripped in the jaw to a drop positioning, the jaw opening and dropping the part and the travel cylinder repositioning the rods for the next cycle.

MODIFICATION II

A second consideration is illustrated with respect to FIG. 8. Here the third guide rod 119 A is cut back and is attached to the blind end of the extracting or locating cylinder; namely, to the back plate 63 as by the fastener 161.

The front plate of the locating cylinder at 65 is provided with a longitudinal bore 165 for the bearing guide 167 slidably receiving carrier rod 169. This rod is aligned with the lower guide rod 119 A, is arranged forwardly thereof and is slidably positioned through guide bearing 167.

The forward end of the carrier rod extends through longitudinal bore 171 in the jaw actuating assembly and is secured thereto by fastener 173.

The stop bumper 175 is secured upon the end of carrier rod 169 to, thus, by its engagement with bearing guide 167 limit forward movement of jaw actuating assembly 125.

The function and operation of the jaw actuator is the same, since when the jaw actuating assembly is restrained against further forward movement, on continued longitudinal movement of the second piston rod 71, said piston rod moves forwardly actuating the third piston rod 143, FIG. 7, for actuating the jaw assembly.

In this modification, by the use of the fourth shortened lower guide rod 119 A and the use of the longitudinally aligned carrier rod 169, it is seen that there can be considerably longer jaw travel until the stop 175 on the carrier rod engages bearing 167.

Since the carrier rod is bolted to the jaw actuating assembly 125 and is slidably mounted upon the front plate 65 of the locating cylinder 67, there will be continued travel of the jaw actuator assembly 125 until the stop 175 engages bearing 167. At this time, the jaws are actuated to close on the workpiece.

Having described my invention, reference should be had to the following claims.

I claim:

1. In a travel cylinder and actuator for a workpiece gripper;
   a travel cylinder assembly including an upright front bushing plate;
   an upright rear bushing plate longitudinally spaced therefrom and secured thereto;
   a pair of parallel laterally spaced longitudinally extending bushing housings, and a third bushing housing centrally disposed between, parallel to and below said pair of bushing housings;
   said bushing housings extending between and secured to said bushing plates;
   ball bushings in each housing;
   a cylinder having a reciprocal first piston rod projecting therefrom interposed between said pair of bushing housings and at one end secured to said front bushing plate;
   a hanger rod parallel to, spaced above said cylinder and at one end secured to said cylinder, extending through and secured to said bushing plates;
   a series of guide rods extending through said bushings respectively;
   an upright guide rod bracket interposed between and secured to the one ends of said guide rods;

an actuating cylinder assembly coaxial to said travel cylinder assembly, consisting of an upright front bracket;

an upright rear bracket spaced therefrom;

and a cylinder with reciprocal second piston rod extending between said brackets and secured thereto;

said first piston rod secured to said rear bracket;

said second piston rod adapted for securing to and actuating a workpiece gripper;

a pair of said guide rods at their other ends extending through both said brackets and secured thereto;

the third of said guide rods extending through said rear bracket and secured thereto.

2. In the travel cylinder and actuator assembly of claim 1, the securing of said bushing plates to each other including a series of tie rods.

3. In the travel cylinder and actuator assembly of claim 1, a stop bumper on said opposed pair of guide rods bearing against the guide rod bracket, and adapted for operative engagement with said rear bushing plate.

4. In the travel cylinder and actuator assembly of claim 1, a clamp interposed between said hanger rod and said rear bushing plate.

5. In the travel cylinder and actuator assembly of claim 1, said hanger rod being hollow adapted for pressurizing one end of said travel cylinder; said opposed laterally related guide rods being hollow adapted to respectively pressurize opposite ends of said actuator cylinder.

6. In an extractor-feeder actuating and positioning unit for a workpiece gripper, the combination:

a travel assembly including a cylinder and reciprocal first piston rod;

a jaw positioning assembly axially connected to said first piston rod, including a cylinder and a reciprocal second piston rod;

and a jaw actuating assembly having a reciprocal third piston rod axially projecting therefrom connected to said second piston rod, adapted on reciprocal movement to control opening and closing of the jaws of a workpiece gripper;

said travel assembly including guide and support means mounting its cylinder;

a hanger rod above and parallel to said cylinder and connected thereto and to said guide and support means;

a pair of parallel laterally spaced reciprocal guide rods, and a third reciprocal guide rod disposed between, parallel to and below said pair of guide rods;

a bracket fixedly interconnecting the one ends of said guide rods;

stop bumpers on said guide rods adjacent said bracket adapted to engage said support and guide means and limit forward movement of said guide rods and jaw positioning assembly;

said guide rods slidably extending through said guide and support means;

said jaw positioning assembly cylinder including spaced front and rear support plates;

said guide rods extending transversely through said support plates and secured thereto;

said jaw positioning cylinder moving in unison with said guide rods;

said third guide rod extending forwardly of said jaw positioning assembly;

said jaw actuating assembly including a body reciprocally mounted upon and movable along said third guide rod;

a stop bumper adjacent the end of said third guide rod limiting forward positioning movement of said jaw actuating assembly;

said body having a bore slidably receiving the free end of said second piston rod;

said third piston rod extending through said bore, at one end connected to said second piston rod and at its other end projecting from said jaw actuating assembly adapted for longitudinal movement in said bore with said second piston rod to operatively control the jaws of a gripper head after said body has engaged said latter bumper;

first pneumatic means adapted to selectively pressurize opposite ends of said travel assembly cylinder for effecting initial feed movements of said jaw positioning assembly and jaw actuating assembly;

and second pneumatic means adapted to selectively pressurize opposite ends of said jaw positioning assembly cylinder for advancing and retracting said jaw actuating assembly relative to said travel assembly and adapted on stopping thereof to successively actuate said jaw actuating assembly.

7. In the extractor-feeder actuating positioning unit of claim 6, means adjustably mounting said latter bumper stop on the end of said third guide rod for fine positioning of said jaw actuating assembly.

8. In the extractor-feeder actuating and positioning unit of claim 6, mounting of said jaw actuating assembly body on said third guide rod including a longitudinal bore in said body;

and a guide rod bushing retained in said bore receiving said third guide rod.

9. In the extractor-feeder actuator and positioning unit of claim 6, a bushing secured within and at one end of said third piston rod bore guidably receiving said second piston rod; a washer nested in said bore movably mounted on said third piston rod and normally bearing against said latter bushing and said second piston rod; and a coil spring in said bore surrounding said third piston rod and interposed between said body and said washer; whereby initial forward movement of said third piston rod relative to said body closing said jaws, compresses said spring, whereupon, pressurizing said travel cylinder assembly for retraction of said first and second piston rods, said spring expands to assist in a quick retraction of said third piston rod and opening of said jaws.

10. In an extractor-feeder actuating and positioning unit for a workpiece gripper, the combination:

a travel assembly including a cylinder and reciprocal first piston rod;

a jaw positioning assembly axially connected to said first piston rod, including a cylinder and a reciprocal second piston rod;

and a jaw actuating assembly having a reciprocal third piston rod axially projecting therefrom connected to said second piston rod, adapted on reciprocal movement to control opening and closing of the jaws of a workpiece gripper;

said travel assembly including guide and support means mounting its cylinder;

a hanger rod above and parallel to said cylinder and connected thereto and to said guide and support means;

a pair of parallel laterally spaced reciprocal guide rods, and a third reciprocal guide rod disposed between, parallel to and below said pair of guide rods;

a bracket fixedly interconnecting the one ends of said guide rods;

stop bumpers on said guide rods adjacent said bracket adapted to engage said support and guide means and limit forward movement of said guide rods and jaw positioning assembly;

said guide rods slidably extending through said guide and support means;

said jaw positioning assembly cylinder including spaced front and rear support plates;

said pair of guide rods extending transversely through said support plates and secured thereto;

the third guide rod extending through, secured to and terminating at said rear support plate;

said jaw positioning cylinder moving in unison with said guide rods;

a carrier rod spaced forwardly of and aligned with said third guide rod slidably extending through said front support plate, forwardly thereof and at one end, secured to said jaw actuating assembly;

said jaw actuating assembly including a body secured to said carrier rod;

the latter adapted for reciprocal movement upon and with respect to said jaw positioning assembly;

a stop bumper adjustably mounted adjacent the other end of said carrier rod for limiting forward positioning movement of said jaw actuating assembly on engagement with said front support plate;

said body having a bore slidably receiving the free end of said second piston rod;

said third piston rod extending through said bore, at one end connected to said second piston rod and at its other end projecting from said jaw actuating assembly adapted for longitudinal movement in said bore with said second piston rod to operatively control the jaws of a gripper head after the carrier rod stop bumper has engaged said front support plate;

first pneumatic means adapted to selectively pressurize opposite ends of said travel assembly cylinder for effecting initial feed movements of said jaw positioning assembly and jaw actuating assembly;

and second pneumatic means adapted to selectively pressurize opposite ends of said jaw positioning assembly cylinder for advancing and retracting said jaw actuating assembly relative to said travel assembly and adapted on stopping thereof to successively actuate said jaw actuating assembly.

11. In the extractor-feeder unit of claim 10, a bearing guide secured upon said front support plate slidably receiving said carrier rod.

* * * * *